(12) United States Patent
O'Shea et al.

(10) Patent No.: US 8,059,254 B1
(45) Date of Patent: Nov. 15, 2011

(54) TRANSPARENT HEATSINK/STRUCTURE/INTERCONNECT FOR TILING SPACE BASED OPTICAL COMPONENTS

(75) Inventors: Robert D. O'Shea, Harvard, MA (US); Michael R. Benoit, Holden, MA (US)

(73) Assignee: Raytheon Company, Watham, MA (US)

( * ) Notice: Subject to any disclaimer, the term of this patent is extended or adjusted under 35 U.S.C. 154(b) by 407 days.

(21) Appl. No.: 12/478,397

(22) Filed: Jun. 4, 2009

Related U.S. Application Data

(60) Provisional application No. 61/058,760, filed on Jun. 4, 2008.

(51) Int. Cl.
*G02F 1/1333* (2006.01)
*G02F 1/1343* (2006.01)
*F28F 1/42* (2006.01)

(52) U.S. Cl. .......... 349/161; 349/162; 349/139; 349/84; 165/179

(58) Field of Classification Search .................. 349/161, 349/162, 139, 84; 165/179
See application file for complete search history.

(56) References Cited

U.S. PATENT DOCUMENTS

| | | | |
|---|---|---|---|
| 4,141,651 A | 2/1979 | Smith et al. | |
| 4,229,106 A | 10/1980 | Dorschner et al. | |
| 4,284,329 A | 8/1981 | Smith et al. | |
| 4,482,249 A | 11/1984 | Smith, Jr. et al. | |
| 4,525,028 A | 6/1985 | Dorschner | |
| 4,548,501 A | 10/1985 | Smith et al. | |
| 4,687,331 A | 8/1987 | Holz et al. | |
| 4,813,766 A | 3/1989 | Keene et al. | |
| 4,813,774 A | 3/1989 | Dorschner et al. | |
| 4,818,087 A | 4/1989 | Dorschner | |
| 4,964,251 A * | 10/1990 | Baughman et al. | .......... 52/171.3 |
| 4,964,701 A | 10/1990 | Dorschner et al. | |
| 5,004,343 A | 4/1991 | Dorschner et al. | |
| 5,018,835 A | 5/1991 | Dorschner | |
| 5,084,898 A | 1/1992 | Dorschner et al. | |
| 5,093,740 A * | 3/1992 | Dorschner et al. | ............ 349/202 |
| 5,093,747 A | 3/1992 | Dorschner | |
| 5,126,869 A | 6/1992 | Lipchak et al. | |
| 5,151,814 A | 9/1992 | Grinberg et al. | |
| 5,233,673 A | 8/1993 | Vali et al. | |
| 5,253,033 A | 10/1993 | Lipchak et al. | |
| 5,333,046 A | 7/1994 | Smith et al. | |
| 5,412,475 A | 5/1995 | Smith et al. | |

(Continued)

OTHER PUBLICATIONS

Dorschner, et al.; "Multi-Access Lasercom for Air-Space Communications;" Raytheon Company; Unclassified—Noforn; Oct. 16, 2003; 14 pages.

(Continued)

*Primary Examiner* — Mike Qi
(74) *Attorney, Agent, or Firm* — Daly, Crowley, Mofford & Durkee, LLP

(57) ABSTRACT

A transmissive beam steering aperture includes a common superstrate provided from an optical material and having first and second opposing surfaces with at least one of the first and second surfaces having an electrode coating provided thereon to provide the at least one surface as a common electrode surface and having a first plurality of electrically isolated common electrodes. One or more electrode containing substrates is disposed over respective ones of the first plurality of electrically isolated common electrodes to form one or more one liquid crystal (LC) cells. In one embodiment, the transmissive beam steering aperture is used as an aperture in an optical phased array.

22 Claims, 10 Drawing Sheets

U.S. PATENT DOCUMENTS

| | | | |
|---|---|---|---|
| 5,963,682 A * | 10/1999 | Dorschner et al. | 385/16 |
| 6,246,369 B1 | 6/2001 | Brown et al. | |
| 6,282,224 B1 | 8/2001 | Smith et al. | |
| 6,490,076 B2 | 12/2002 | Pepper | |
| 6,545,563 B1 | 4/2003 | Smith | |
| 6,597,836 B2 | 7/2003 | Johnson et al. | |
| 6,704,474 B1 | 3/2004 | Dorschner et al. | |
| 6,810,164 B2 | 10/2004 | Dorschner et al. | |
| 7,095,925 B2 | 8/2006 | Grunnet-Jepson et al. | |
| 7,215,472 B2 | 5/2007 | Smith et al. | |
| 2005/0069245 A1 | 3/2005 | Mitchell et al. | |

OTHER PUBLICATIONS

Dorschner, et al; "Multi-Access Lasercom Node for Satellite Communications;" Raytheon Company; Unclassified—Noforn; Oct. 16, 2003; 6 pages.

"Electronic Beam Steering in Access Networks;" Milcom:08; Unclassified; Nov. 17, 2008; 26 pages.

Miniscalco, et al.; "Coherent Beam Combining and Optical Space-Time Division Multiple Access;" Proc. Of SPIE; vol. 7814; 78140S-1; downloaded Jan. 11, 2011; 10 pages.

* cited by examiner

TRANSPARENT HEATSINK/STRUCTURE/INTERCONNECT FOR TILING SPACE BASED OPTICAL COMPONENTS

CROSS REFERENCE TO RELATED APPLICATION

This application claims the benefit of U.S. Provisional Application No. 61/058,760 filed Jun. 4, 2008 under 35 U.S.C. §119(e) which application is hereby incorporated herein by reference in its entirety.

FIELD OF THE INVENTION

The structures and techniques described herein relate to electronically scanned array antennas and more particularly to optical phased arrays (OPAs).

BACKGROUND OF THE INVENTION

As is known in the art, "space-based" systems refer to space-borne systems that may have any of a variety of different purposes. A space-based radar, for example, refers to space-borne radar systems which may be used for object detection or other purposes. Similarly, space-based communication systems refers to space-borne communications systems. In telecommunication, a communications system is a collection of individual components such as communications networks, transmission systems, relay stations, tributary stations, and data terminal equipment (DTE) usually capable of interconnection and interoperation to form an integrated whole. Thus, a space-based communication system refers to a communication system in which at least some components are space-borne.

As is also known, a difficult challenge for space-based systems including space-based communication systems is minimizing size, weight and power (SWAP). Some space-based communication systems utilize space-based optical phased arrays (OPAs). In OPA systems, light controlling elements (e.g. spatial light modulators also referred to as OPA elements) are used to steer or aim light beams (e.g. laser beams), or steer or aim sensors, by progressive phase modulation.

OPA systems generally include an OPA aperture provided from a plurality of such OPA elements. In general, OPA elements are limited in size due to manufacturing limitations related to patterning or otherwise providing electrodes on a liquid crystal device or other substrate. To create relatively large apertures, a modular approach is used in which each of a plurality of OPA elements are disposed in individual support/alignment frames to provide framed OPA elements. The framed OPA elements are arrange in groups (or "tiled") in desired patterns to form an entire OPA array.

The use of tiling techniques in such a modular approach, however, introduces multiple problems. One problem is the frame which is used to hold (or support) and align each OPA element adds weight and size to the array of such OPAs which form the OPA aperture. In addition to the added size and weight resultant from using such support/alignment frames, light does not efficiently propagate through the support/alignment frames. Thus, the support/alignment frames cause a blockage in the array aperture which among other things, reduces gain and increases signal loss of the aperture.

To compensate for increased signal loss and reduced gain due to such aperture blockage by the OPA frame structure, it is necessary to increase the size (and consequently the weight) of the OPA aperture. Furthermore, the frames cannot be manufactured with tolerances which ensure alignment of the OPAs with the requisite accuracy. Thus, it is necessary to add so-called adjustment features to the frames. The adjustment features are mechanical devices which can be manipulated to mechanically align t the OPA elements. However, such adjustment features add further weight to the frames.

Yet another problem with OPA apertures relates to non-symmetrical thermal gradients caused by conventional modular OPA aperture designs in which control electronics of each OPA element are coupled to only one side of each OPA element. Such asymmetrical thermal gradients can significantly affect wave front distortion error. To compensate for such asymmetrical thermal gradients, additional heaters and thermal material are sometimes added to each OPA element. This results in a still larger and heavier OPA aperture. Thus, as can be surmised from the above, the modular structure of conventional OPA apertures comes at the cost of additional SWAP due to additional structure added to each individual OPA element.

In general, prior art approaches to solving the above problems have focused on minimizing the size and weight of the frame and related structures supporting each OPA element. Such approaches, however, are limited to practical sizes in the 3 mm range since frames below 3 mm in thickness are generally unable to provide sufficient structural support for the OPA element. Also, lightweight heaters have been used to manage the problems with thermal gradients but at the cost of additional SWAP.

SUMMARY OF THE INVENTION

In accordance with the concepts described herein, it has been recognized that while, limited incremental improvements can be realized with conventional approaches to SWAP reductions at the OPA element level, it would be desirable to reduce SWAP by utilizing an aperture level approach to SWAP reductions.

Thus, in accordance with the present structures and techniques described herein, an optical phased array (OPA) aperture includes a common optical component (sometimes referred to herein as a superstrate) having a plurality of electrodes containing substrates disposed thereover. The OPA aperture is provided from a plurality of optical component substrates disposed in a "tiled" geometry on a surface of the common optical component. Each OPA element has its own aperture, which will sometimes be referred to herein as an OPA element aperture or more simply an element aperture. The approach of disposing a plurality of substrates over a common superstrate provides structural, thermal management and interconnect advantages over prior art techniques. By replacing traditional modular OPA structures (e.g. OPA elements in frames) with a common superstrate structure, an OPA having improved alignment and thermal management characteristics is provided.

In the case of OPA technology, a common superstrate is populated with multiple OPA elements with each of the OPA elements being arranged side-to-side (i.e. "tiled") on the common superstrate. In one embodiment, the OPA elements are provided as juxtaposed liquid crystal (LC) cells. The common superstrate serves as a structural member of the OPA aperture and serves to hold each OPA element in alignment. This avoids the need for mechanical alignment structures in the OPA aperture. The common superstrate approach also results in an OPA aperture having thermal variations, which are more symmetrical than thermal variations found in prior art OPA apertures. By having relatively symmetric thermal variations in the OPA aperture, it is easier to reduce and manage the thermal variations within the array. Also, by reducing thermal gradients, the need for additional heaters and material in order to meet wave front error requirements in the OPA, is reduced. The material for the common superstrate is chosen for each application to optimize both structural and thermal requirements taking necessary trade-offs into account.

In one alternate embodiment, channels are machined into the common superstrate and thermally conductive material is disposed in the channels to transfer heat away from electronic circuits (e.g. circuits to control the OPA) disposed on the common superstrate. Also, the common superstrate in the OPA technology application does not have the small features of the substrate electrodes. This allows the common superstrate to be patterned and processed with commercial tooling. Larger sizes are thus possible, but are limited by optical distortion issues and are also limited in practice by the size of available materials and the ability to hold optical tolerances.

Another alternate embodiment applies to tiled arrays larger than 2×2. In this case, the "inner" sub-apertures need to interconnect without blocking the OPA aperture. The common superstrate can include multiple layers of conductors either as patterned metal on the superstrate or a circuit card material. This interconnect could be located under each LC cell's "glue line" and make contact to the substrate electronics during cell assembly. The result would be a single flex cable serving the entire tiled array. This variant assumes that the application specific integrated circuits (ASICs) are reduced in size and distributed around the sub-apertures. The distributed "chicklet" ASICs are interconnected on power and signal busses.

SWAP reduction has, until this point, been focused on size and weight reduction of the individual optical sub-apertures. The assumption of maintaining this modular approach has never been challenged.

A second solution that is described is the recognition that the common electrode side of an OPA can be fabricated using commercial methods at much larger sizes. Populating multiple LC cells on a common superstrate is described and has not yet been attempted. The third novel feature is the ability to provide interconnection circuits on the common superstrate for applications larger than 2×2 OPAs.

In accordance with a further aspect, described herein is a common superstrate for use in an optical phased array (OPA) aperture. The common superstrate is provided from an optical material and having first and second opposing surfaces with at least one of the first and second surfaces having an electrode coating provided thereon to provide the at least one surface as a common electrode surface. The common superstrate is provided having a divider on each common electrode surface. The divider provides each common electrode surfaces having a first plurality of electrically isolated common electrodes.

In one embodiment, the common superstrate has a thermally conductive channel provided in at least one of the first and second opposing surfaces of said common superstrate.

In one embodiment, a first plurality of liquid crystal (LC) cells are formed by disposing a first plurality of electrode containing substrates over corresponding ones of the first plurality of electrically isolated common electrodes provided in the common superstrate.

In one embodiment, each of the first and second opposing surfaces of the superstrate have an electrode coating provided thereon to provide each of the first and second opposing superstrate surfaces as a common electrode surfaces.

In one embodiment, a first plurality of electrode containing substrates are disposed over corresponding ones of a first plurality of electrically isolated common electrodes provided on a first surface of the common superstrate to form a first plurality of liquid crystal (LC) cells and a second plurality of electrode containing substrates are disposed over corresponding ones of a second plurality of electrically isolated common electrodes provided on a second opposing surface of the common superstrate to form a second plurality of liquid crystal (LC) cells. In some embodiments, the first plurality of LC cells is equal to the second plurality of LC cells and in other embodiments the first plurality of LC cells is not equal to the second plurality of LC cells.

In one embodiment, the common superstrate has a thermally conductive channel provided in at least one of the first and second opposing common superstrate surfaces In one embodiment, control electronics are coupled to the LC cells. In some embodiments, at least some of the control electronics are disposed in the thermally conductive channel. In one embodiment, a heat sink coupled to or provided as part of a portion of the superstrate and thermally coupled to the channel having the thermally conductive material disposed therein such that the heat sink is in thermal contact with at least some of said control electronics.

In accordance with a further aspect, an optical phased array (OPA) aperture comprises a common superstrate having first and second opposing surfaces with a first one of the first and second surfaces corresponding to a common electrode surface having a plurality of electrically isolated common electrodes; and a like plurality of electrode containing substrates, each of the first plurality of electrode containing substrates disposed over a corresponding one of the first plurality of electrically isolated common electrodes provided in the common superstrate to form a first plurality of liquid crystal (LC) cells such that each of the plurality of LC cells electrically interacts with only a corresponding one of said plurality of electrically isolated common electrodes on the common electrode surface of said common superstrate.

In one embodiment, the OPA further comprises a plurality of control circuits, each of which is coupled to a corresponding one of the plurality of LC cells. In some embodiments, the common superstrate has a channel provided in at least one of the first and second opposing surfaces thereof and at least some of the control circuits are disposed in the channel. In some embodiments, the channel is provided having a thermally conductive material disposed therein to provide the channel as a thermally conductive channel which channels heat away from the control circuits. In one embodiment, the OPA further includes a heat sink provided as part of the superstrate (or coupled to a portion of the superstrate) and thermally coupled to the thermally conductive channel such that the heat sink is in thermal contact with at least some of said control circuits.

In one embodiment, the OPA common superstrate has a plurality of electrically isolated common electrodes on first and second opposing surfaces thereof and LC cells are formed on the plurality of electrically isolated common electrodes on both the first and second surfaces of the common superstrate.

It should thus be appreciated that while reference is sometimes made herein to a particular embodiment corresponding to an optical phased array (OPA) application, such reference is made only to promote clarity in the description of the concepts sought to be protected. It should thus be appreciated that the concepts, apparatus and methods described herein can equally be applied to any transmissive beam steering device (TBSD).

Thus, in accordance a further aspect of the concepts, structures and techniques described herein, a transmissive beam steering device utilizes a common optical component (a/k/a a superstrate) having a plurality of electrodes containing substrates disposed thereover. The transmissive beam steering device (TBSD) has an aperture provided from a plurality of optical component substrates disposed in a "tiled" geometry on a surface of the common optical component. Each element of the TBSD has its own aperture, which will sometimes be referred to herein as an TBSD element aperture or more simply an element aperture. The approach of disposing a plurality of substrates over a common superstrate provides structural, thermal management and interconnect advantages over prior art techniques. By replacing traditional modular structures (e.g. OPA elements in frames) with a common superstrate structure, a TBSD having improved alignment and thermal management characteristics is provided.

BRIEF DESCRIPTION OF THE DRAWINGS

The foregoing features of the concepts, structures and techniques described herein may be more fully understood from the following description of the drawings in which.

DETAILED DESCRIPTION OF THE PREFERRED EMBODIMENTS

Figure 1:
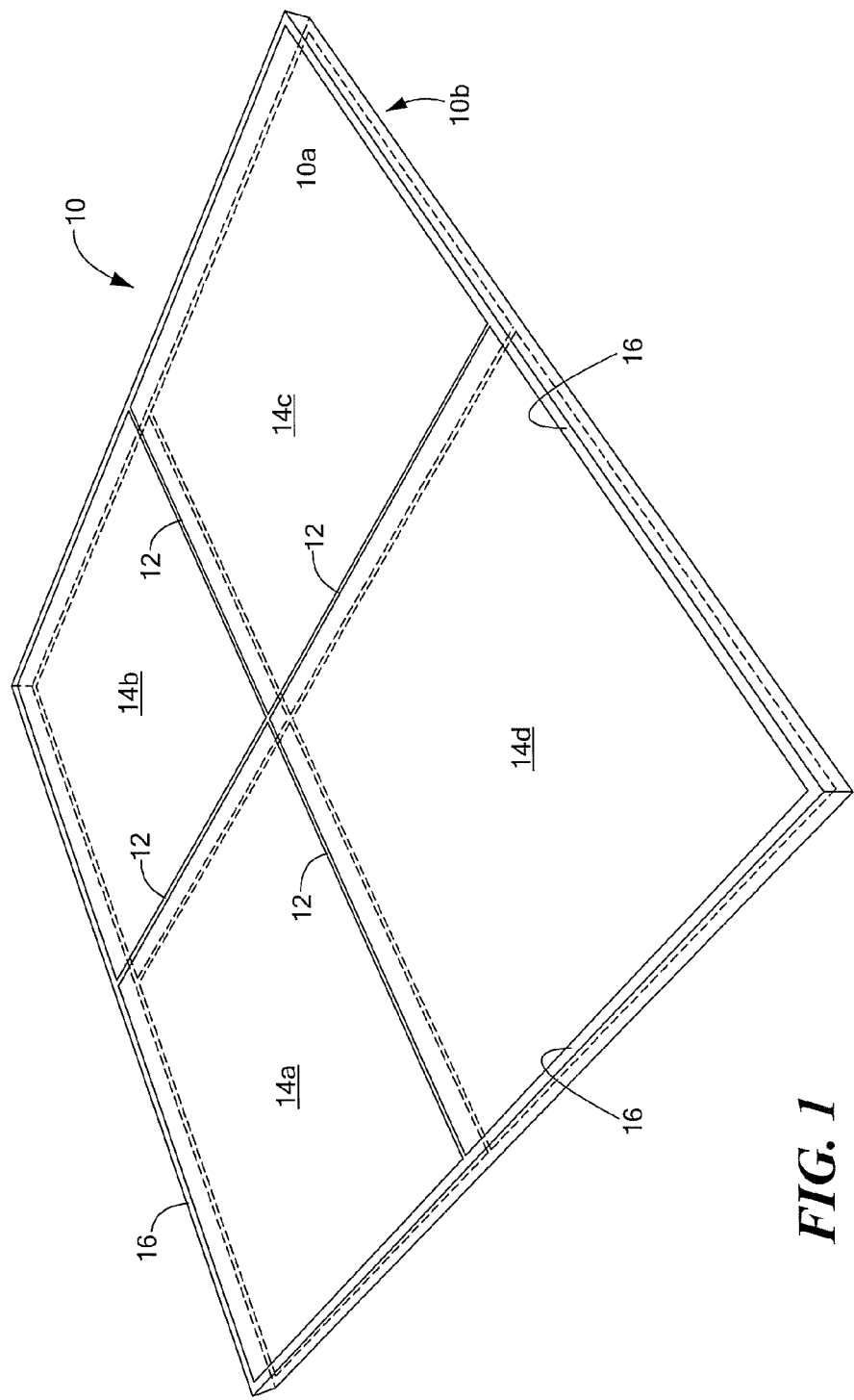
FIG. 1 is an isometric view of a superstrate having a plurality of electrically isolated regions.

Referring now to FIG. 1, a common superstrate 10 has first and second opposing surfaces 10a, 10b (only surface 10a being visible in FIG. 1) with anti-reflective (A/R) and electrode coatings provided on surface 10a. Divider regions 12 are provided in the superstrate surface to form a plurality of superstrate regions or cells 14a-14d, generally denoted 14. Each of the regions 14a-14d are electrically isolated from each other. As will be described below, the electrode coatings on the superstrate 10 are such that each of the cells 14 can act as a common electrode (or ground plane) for an optical element (not shown in FIG. 1).

Although using the entire surface 10a as a common electrode is possible (i.e. rather than forming or otherwise providing electrically isolated cells as shown in FIG. 1), forming cells 14a-14d with electrically isolated ground planes reduces the capacitance associated with each cell. This allows control circuitry to more easily provide control signals to other circuitry, including optical elements, disposed in the cell regions 14 as will be described hereinbelow. The particular size and shape formed by the divider regions 12 on the common superstrate 10 are selected in accordance with a variety of factors important for a particular application of interest. It should, however, be appreciated that the regions 14 formed by the dividers 12 may be provided having any desired or required size and shape. Thus, although the cells 14 in FIG. 1 are shown having a square shape, other shapes, including but not limited to rectangular, triangular, polygonal, round, substantially oval, arc-shaped, regular shapes or patterns or irregular shapes or patterns, may also be used.

In the exemplary embodiment of FIG. 1, four regions or cells 14a-14d are shown. The juxtaposed cells 14a-14d are said to be disposed in a so-called "tiled" or side-by-side geometry. In this exemplary embodiment, the divider regions 14 are provided by patterning the common superstrate such that each cell 14a-14d is electrically isolated from the other cells. In this way, in an optical phased array (OPA) application, each cell can form a common electrode.

Although four cells 14a-14d are shown on the superstrate 10, in other embodiments, the superstrate may be provided having more or fewer than four cells as will be described hereinbelow.

In general, the superstrate is provided from an optical quality material having a thermal conductivity selected to substantially match a thermal output of a control circuit in thermal communication with the superstrate. Thus, the particular material from which to provide the superstrate is selected taking into account both optical and thermal characteristics of the material. Or stated differently, in selecting a particular material to use for the common superstrate, consideration is given to optical factors as well as to the power level of the application as well as the expected power dissipation (e.g. in the form of heat) of any control circuits. Thus, optical, electrical, and thermal factors are all considered. By considering thermal factors in addition to optical and electrical factors in selecting the material, it is possible to select a superstrate which provides an optical function as well as a thermal (e.g. heat sinking) function. In one particular embodiment, the superstrate is provided having a thickness of about 3 mm and is provided from ALON.

In one embodiment, each of the cells 14 has a corresponding control circuit provided as an application specific integrated circuit (ASIC). Thus, in the exemplary embodiment of FIG. 1 where the superstrate has four cells defined on one surface thereof, four ASIC control circuits (i.e. one control circuit for each cell) may also be coupled to the superstrate. This will be more clearly shown and described in conjunction with FIGS. 2-6 below.

As mentioned above, the superstrate in FIG. 1 is shown to have four cells disposed on one surface thereof. It should, however, be appreciated that NR and electrode coatings can be provided on each surface of the common superstrate (i.e.

both surfaces 10a, 10b). Thus, electrically isolated common electrodes can also be provided on both surfaces 10a, 10b of common superstrate 10. Thus, the exemplary superstrate 10 shown in FIG. 1 can, for example, support eight isolated common electrodes (i.e. four cells on two opposing surfaces 10a, 10b of the superstrate 10).

Figure 2:
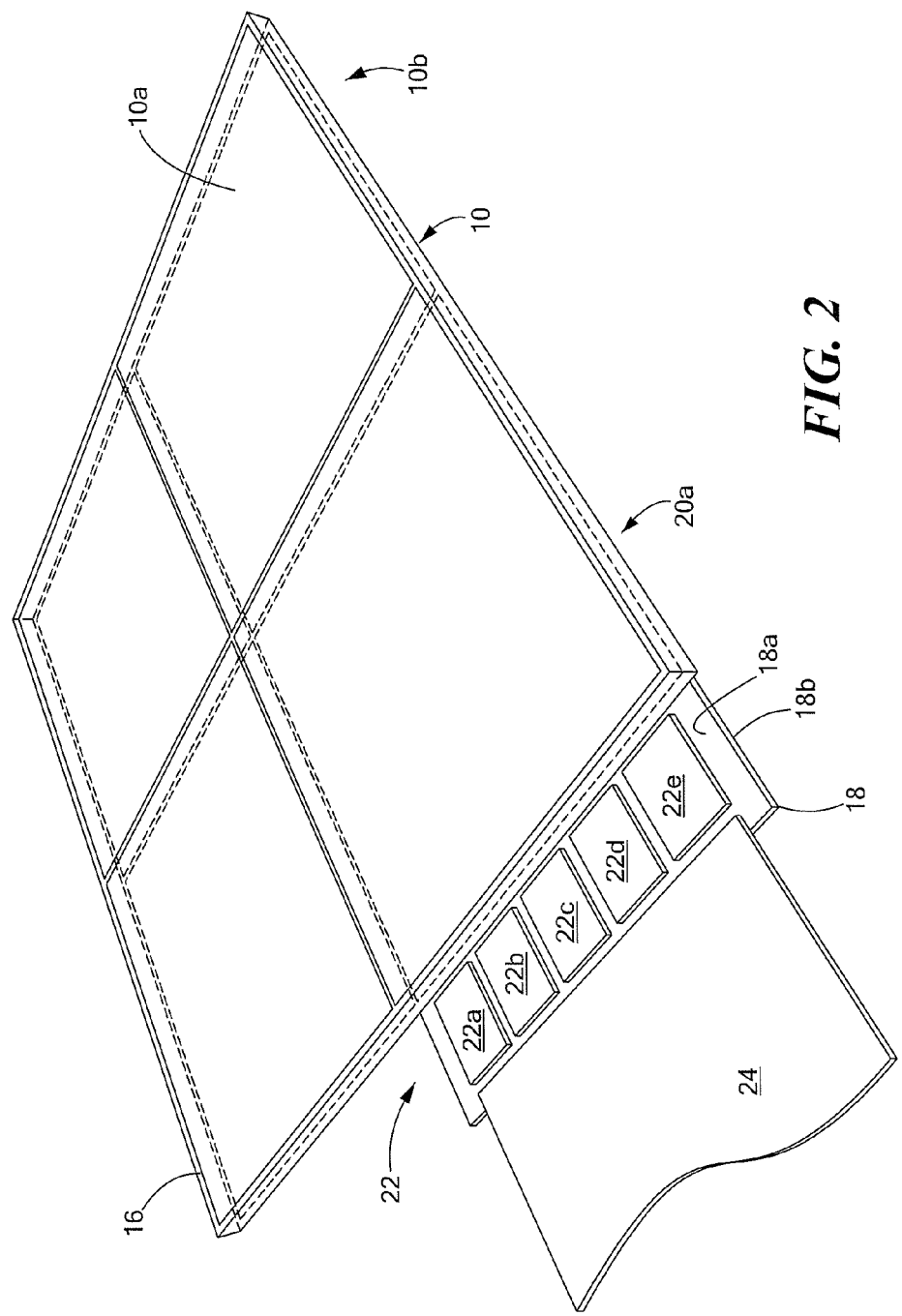
FIG. 2 is an isometric view of a superstrate having a plurality of electrically isolated regions and a substrate coupled thereto.

Optionally, common superstrate 10 include channels 16. The channels 16 may be machined, formed or otherwise provided in the superstrate 10. In one embodiment, the channels are provided around a perimeter of the superstrate 10. In some embodiments, however, the channels maybe located elsewhere on the superstrate. An example would be between cells 14 under the attachment line between the superstrate and substrates (FIG. 2 designation 18). As will be described further below, thermally conductive material is disposed in the channels 16 to promote the transfer of heat away from the regions 14a-14d.

Referring now to FIG. 2, in which like elements of FIG. 1 are provided having like reference designations, an electrode containing substrate 18, having first and second opposing surfaces 18a, 18b is disposed over and coupled to a common electrode portion of the second surface 10b of the superstrate 10. The combination of the electrode containing substrate 18 and the common electrode portion of the superstrate 10 forms a liquid crystal (LC) cell 20a.

The substrate 18 has a control circuit 22 electrically coupled thereto. In the exemplary embodiment of FIG. 2, the control circuit 22 is disposed on a portion of substrate surface 18a. In this exemplary embodiment, the control circuit 22 is provided from a plurality of application specific integrated circuits (ASICs) 22a-22e.

The LC cell 20 has coupled thereto a signal path 24, which may be provided as a flex cable, for example. The signal path 24 provides a means for transmitting signals to and receiving signals from the control circuit 22 of the LC cell 20. In the exemplary embodiment of FIG. 2, the signal path 24 is electrically coupled to the LC cell 20a via conductive paths provided in the substrate 18.

Figure 3:
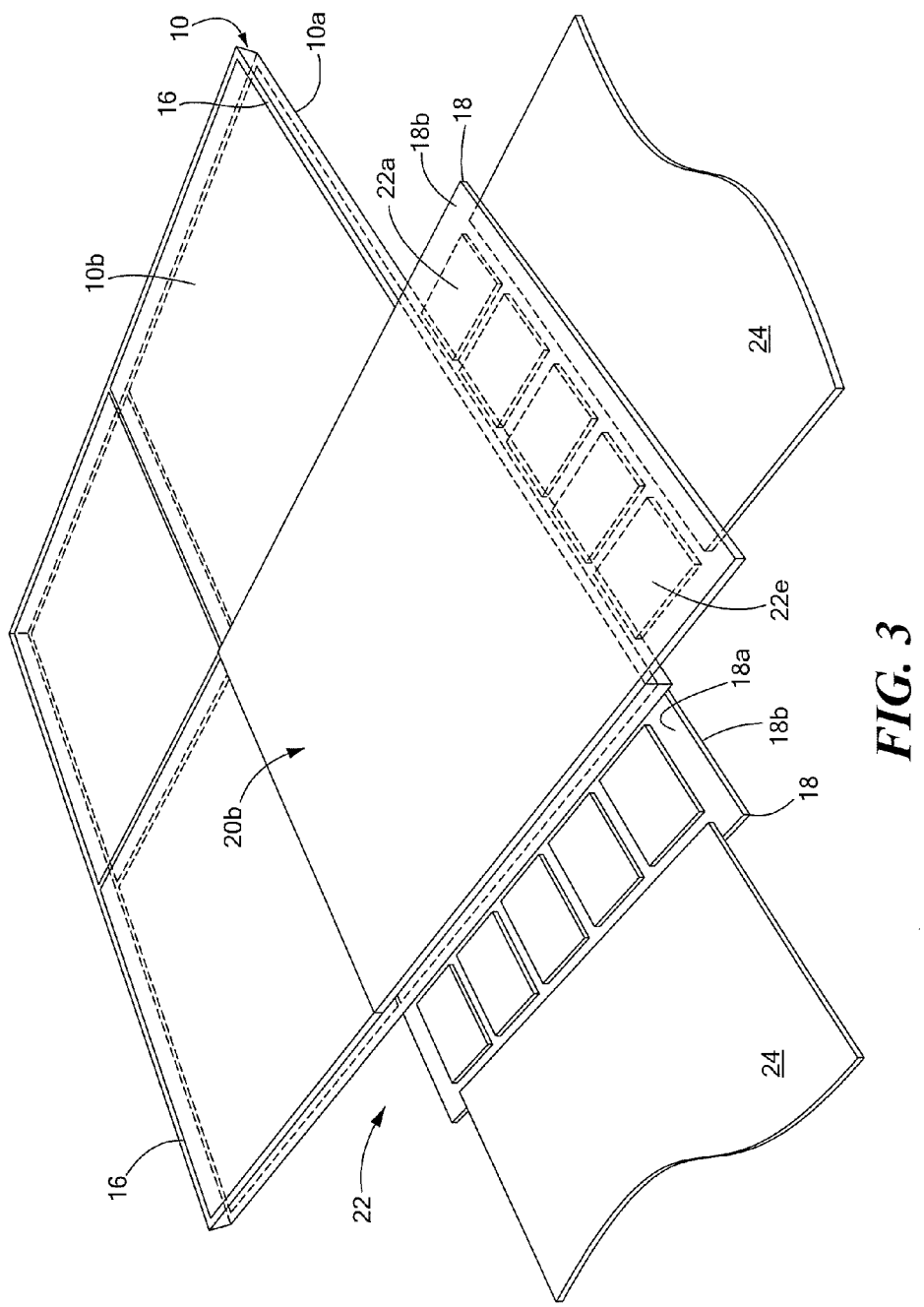
FIG. 3 is an isometric view of a superstrate having a plurality of electrically isolated regions and a plurality of substrates coupled thereto.

Referring now to FIG. 3, a second LC cell 20b is provided by disposing a second electrode containing substrate 21 over a second one of the electrically isolated cells 14 on surface 10a of the common superstrate 10. The control circuits 22a-22e associated with LC cell 20b are shown in phantom since they are on surface 18a of the substrate 18 and thus are not directly visible in FIG. 3.

It should be appreciated that although only two LC cells 20a, 20b are shown in FIG. 3, in practical applications an LC cell would be formed over each of the electrically isolated regions 14. It should also be noted that LC cells may be formed on each of the surfaces 10a, 10b of the common superstrate 10 and thus in the embodiment of FIG. 3, the common superstrate 10 may support a total of eight LC cells (i.e. four LC cells on each surface 10a, 10b of the superstrate 10).

Figure 4:
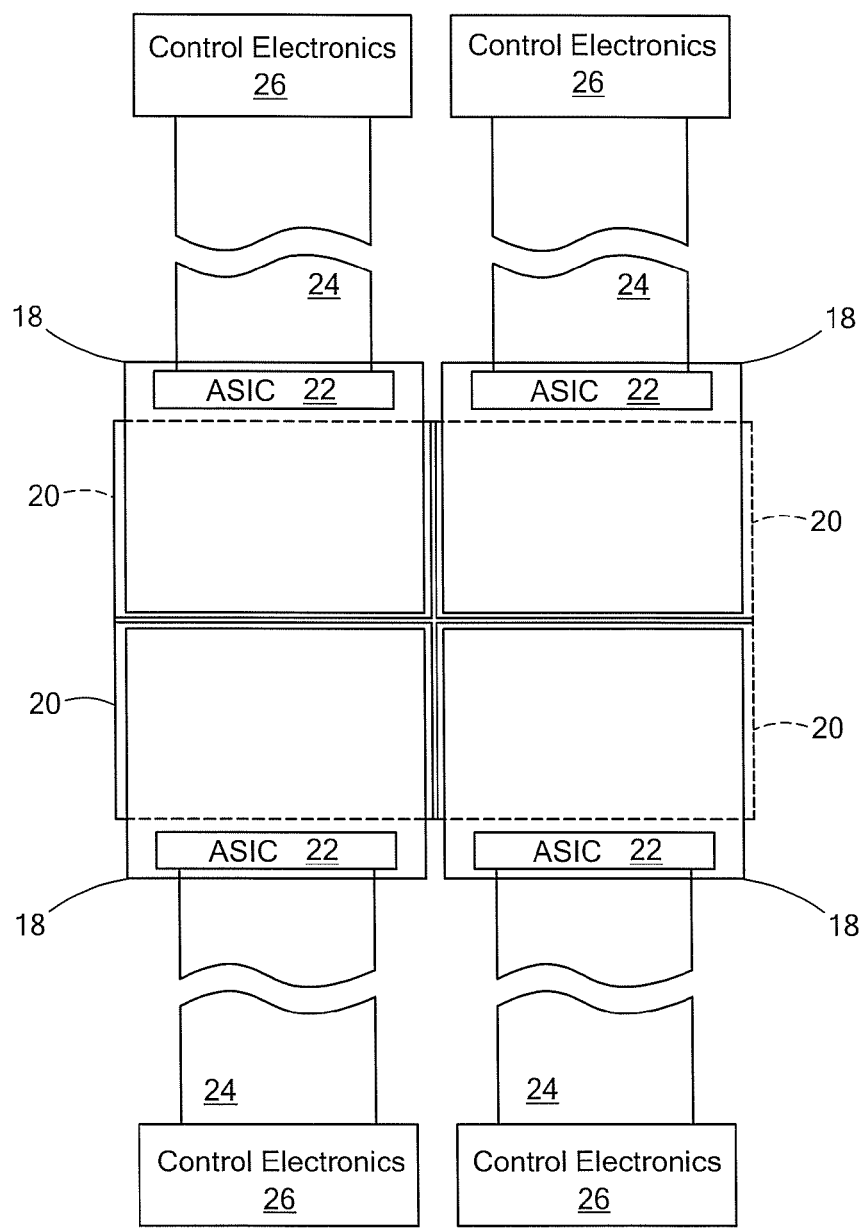
FIG. 4 is a block diagram of a superstrate having a plurality of electrically isolated regions and a plurality of substrates and control electronics coupled thereto.

Referring now to FIG. 4, an OPA 30 is provided having four cells 20 disposed on one side of a common superstrate. Each of the cells 20 is coupled to control electronics 22 via a signal path (e.g. a flex cable) 24.

In the case of OPA technology, and as shown in FIG. 4, the common superstrate is populated with multiple liquid crystal (LC) cells 20 (LC cells 20 are also sometimes referred to herein as "OPA elements" or more simply "elements"). It should be noted that the LC cells are configured in a side-to-side arrangement (or "tiled" arrangement) on the common superstrate. Thus, the common superstrate serves as a structural member of the array holding each OPA element in alignment (both mechanical and electrical alignment). The common superstrates also provide a thermal solution since heating of the LC cells is more symmetric than in prior art approaches. This makes thermal management easier. In particular, the use of a common superstrate allows symmetric placement of heat generating control circuits 22 around the entire perimeter of the superstrate which reduces thermal gradients in the OPA by an amount which eliminates the need for additional heaters and material to meet wave front error requirements. The material for the common superstrate is selected to satisfy both structural and thermal requirements for a particular application.

A variant of this embodiment includes machining channels (e.g. channels 16 as shown in FIGS. 1-3) into the common superstrate 10 and providing thermally conductive material in the channels to promote the transfer of heat away from the on-board electronics (e.g. control circuitry 24). The common superstrate in an OPA technology application does not have the small features of the substrate electrodes. This allows the common superstrate to be patterned and processed with commercial tooling. Larger sizes are thus possible but limited by optical distortion issues. A 5.5 cm 2×2 common superstrate is obtainable. Larger sizes are limited by the size of available materials and the ability to hold optical tolerances.

Another embodiment applies to field arrays larger than 2×2. In this case, the "inner" sub-apertures (i.e. sub-apertures not having any side which forms an outer perimeter of the array aperture) need to interconnect without blocking the array aperture. The common superstrate can include multiple layers of conductors either as patterned metal on the superstrate or a circuit card material. Such interconnects would be under each LC cell's "glue line" and make contact to the substrate electronics during cell assembly. The result would be a single flex cable serving the entire tiled array. This variant assumes that the control electronics (e.g. the ASICs) are reduced in size and physically distributed around the perimeter of the sub-apertures. The distributed "chicklet" ASICs are interconnected on power and signal busses.

Figure 5:
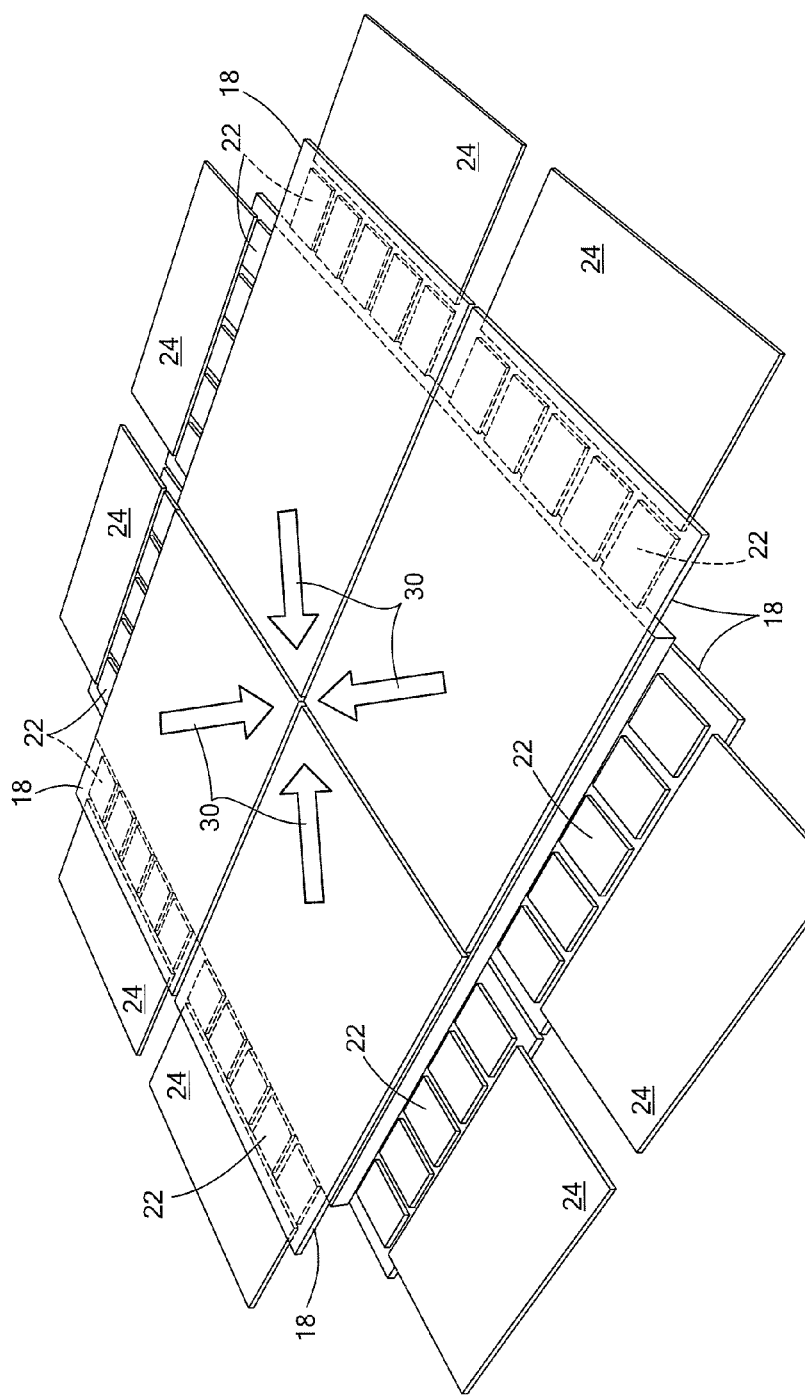
FIG. 5 is an isometric view of a superstrate having coupled to opposing surfaces thereof, a plurality of electrically isolated regions and a plurality of substrates and associated controllers.

Referring now to FIG. 5, in which like elements of FIGS. 1-4 are provided having like reference designations, an OPA is provided having eight LC cells 20 with four cells disposed on each side of the common superstrate. Each of the cells 20 is coupled to a control circuit which in turn is coupled to control electronics (not shown in FIG. 5) via a signal path 24, which may, for example, be provided as a flex cable.

With an arrangement such as that shown in FIG. 5, thermal gradients can occur as indicated by reference designators 30. This may or may not be desirable. In particular, portions of the OPA aperture located proximate the OPA perimeter may become hotter than central portions of the OPA aperture. Since the thermal load from the control electronics are symmetrical from the center and on the common superstrate, these gradients will disappear as the superstrate comes to thermal equilibrium Referring now to FIG. 6, an OPA having eight LC cells (four on each opposing surface of a common superstrate is shown. Thermally conductive channels 16 provided in the superstrate lead to a plurality of heat sink regions 32. The use of thermally conductive channels 16 and heat sink regions 32 reduces thermal gradients in the OPA.

Figure 6:
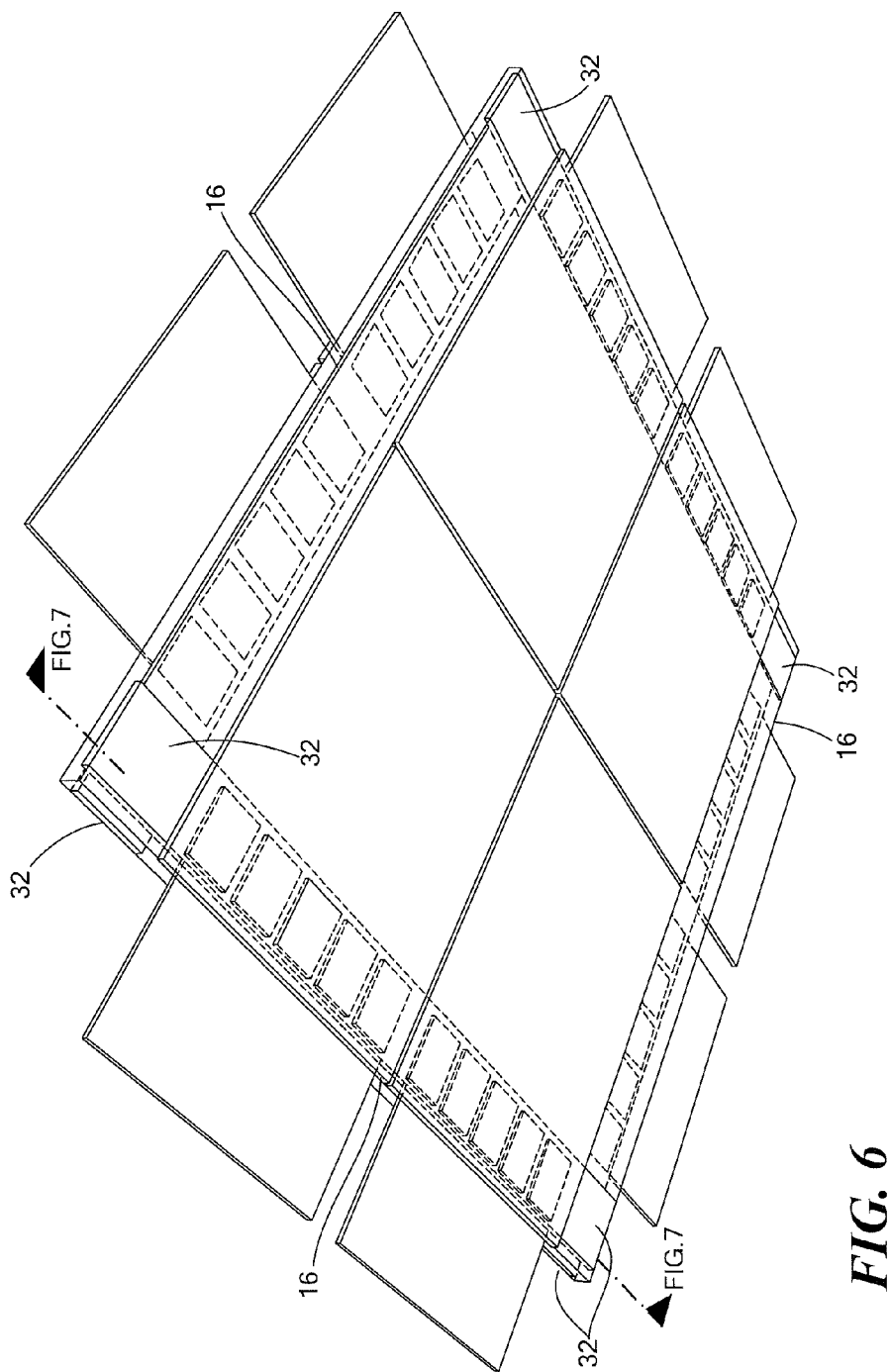
FIG. 6 is an isometric view of a liquid crystal (LC) cell provided from a superstrate having coupled to opposing surfaces thereof, a plurality of electrically isolated regions and a plurality of substrates and associated controllers.
Figure 7:
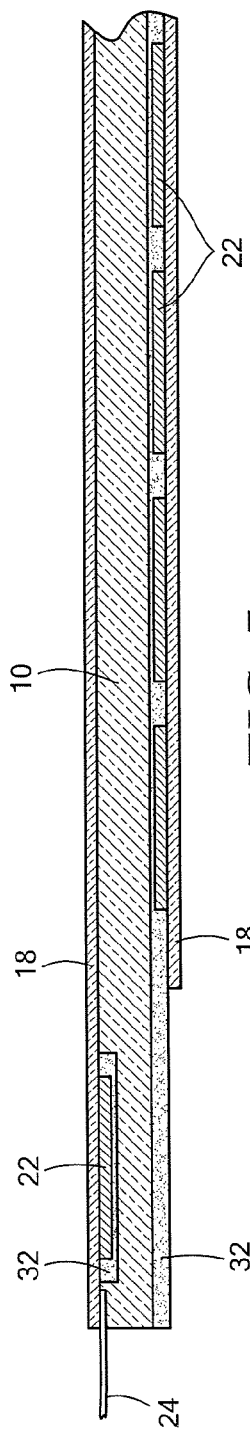
FIG. 7 is a cross-sectional view of the LC cell of FIG. 6 taken across lines 7-7 in FIG. 6.

Referring now to FIG. 7, a cross-sectional view of the OPA shown in FIG. 6 taken across lines 7-7 of FIG. 6 reveals the location of heat sinks 32 relative the superstrate 10 and also reveals control circuits 22 embedded in a portion of electrode containing substrate 18.

Figure 8:
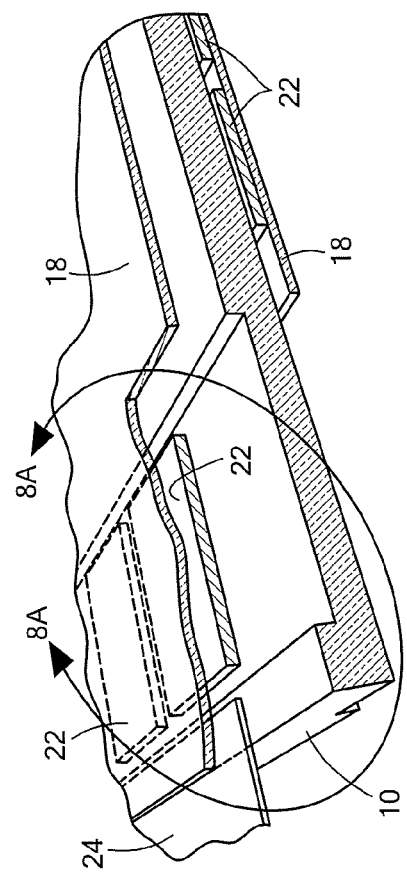
FIG. 8 is an expanded view of a heat sink provided in a liquid crystal (LC) cell.
Figure 8A:
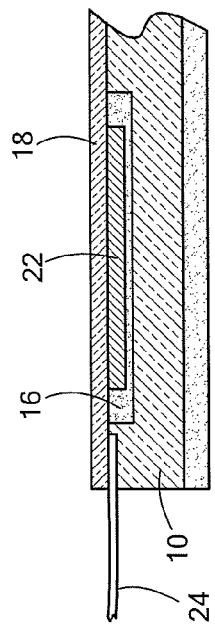
FIG. 8A is a cross-sectional view of the LC cell of FIG. 8 taken across lines 8A-8A in FIG. 8.

FIGS. 8 and 8A are a series of perspective partial cross-sectional views in which control circuits 22 are disposed in a channeled portion of the common superstrate 10. As can be clearly seen in FIG. 8A, thermally conductive material 16 is disposed in the channel about the control circuits 22 to thus form a heat conducting path which transfers heat generated by circuits 22 to a heat sinking region (e.g. heat sink 32 shown in FIG. 6) coupled to thermally conductive path 16. Thermally conductive path 16 may be provided from any highly conductive material that matches the thermal expansion characteristics of the superstrate and the ASICs. Alternatively, the material could be a compliant conductive material such as thermal gasketing material. The thermally conductive path may also be provided as a heat pipe, gasketing material, or a heat spreader. Any thermally conductive material having an appropriate thermal expansion characteristics (e.g. and preferably one which substantially matches the thermal expansion characteristics of the superstrate and the ASICs may be used).

Figure 9:
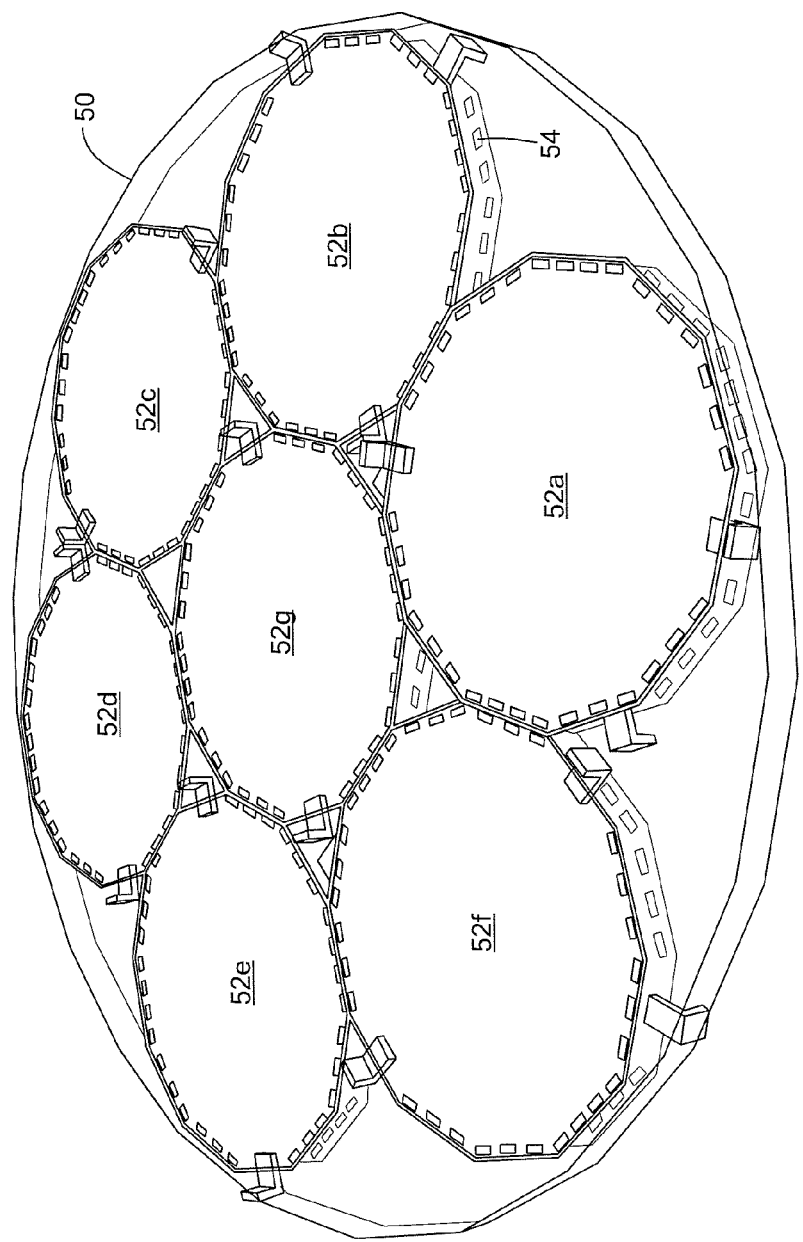
FIG. 9 is an isometric view of an optical phased array (OPA) provided from a superstrate having a plurality of electrically isolated regions with substrates disposed thereon.

Referring now to FIG. 9, a common superstrate 50 having a generally segmented circular shape has a plurality of electrode containing substrates 52a-52g disposed thereover to form seven LC cells. Each of substrates 52a-52g has a plurality of control circuits 54 coupled to the substrates 52a-52g to thereby control the LC cells. Portions of signal paths (e.g. such as signal paths 24 described above) are shown coupled to perimeter portions of each OPA. The signal paths may be provided as flex cables. The signal paths could be provided as shown with a plurality of flex cables routed between the sub-apertures or connected by conductors deposited on the surface of the superstrate.

Figure 10:
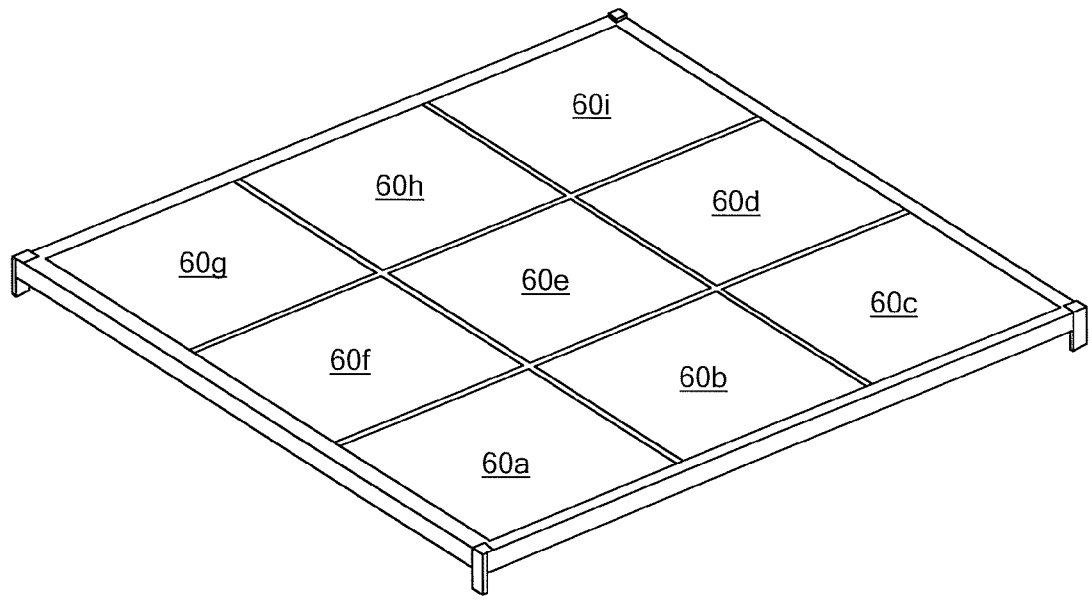
FIG. 10 is an isometric view of an optical phased array (OPA) provided from a superstrate having a plurality of electrically isolated regions with substrates disposed thereon.
Figure 10A:
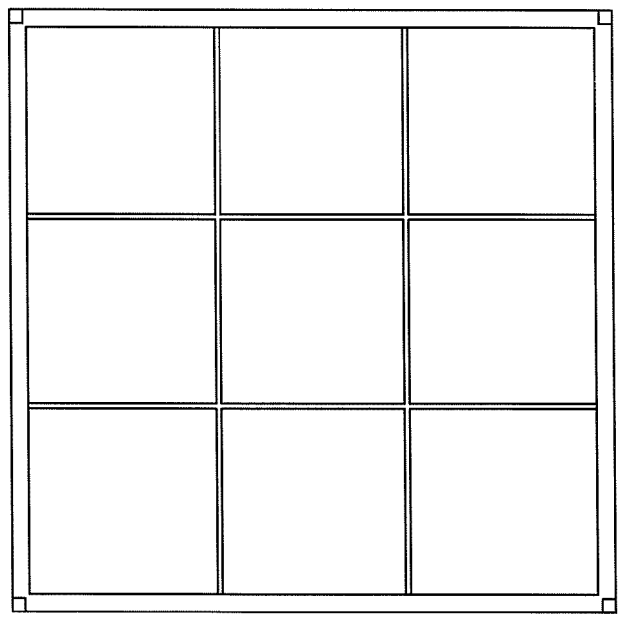
FIG. 10A is top view of the OPA of FIG. 10.

Referring now to FIGS. 10 and 10A, a superstrate 60 is divided into twelve electrically isolated regions 60a-60i. Disposed over each of the regions 60a-60i is a substrate to thus form twelve separate LC cells. The electrical interconnects for the LC cell formed in superstrate region 60e are provided on the common superstrate under the glue line (i.e. the region which defines the material which secures the substrates to the superstrate). The two substrates (e.g. two pieces of glass) are separated by glass fiber spacers (usually between 3 and 11 microns in diameter) to leave a gap for the liquid crystal. As is known, the outside edge of the substrate thus needs to be sealed so as to form a cavity in which the LC material held. In one embodiment epoxy is disposed into a perimeter gap forming a so-called "glue Line".

Since this attachment area must exist to form a bond between the superstrate and the substrate, the area is preferably also used to run circuitry. Conductors can be deposited (or otherwise provided) on the superstrate in this area the same way electrodes are deposited (or otherwise provided). Multiple layers of conductors can also be created by depositing SiO2 (glass) between each conductive layer Thus, OPA interconnects are routed in conductors in the common superstrate and passed to control circuits (e.g. control circuits 22 in FIG. 2) in the super/substrate solder Control circuits (which may be provided as ASICs packaged in a relatively small package having a rectangular shape) are embedded in channels of a common superstrate used to provide OPA 58. The control circuits may be distributed around the aperture of each OPA element 60a-60g (a/k/a as subapertures 60a-60g). Since the control circuits generate heat, in preferred embodiments, the control circuits are uniformly distributed around each OPA elements 60a-60g which helps decrease thermal gradients across the OPA 58.

In one embodiment, OPA 58 is provided by soldering relatively thin substrate assemblies to a common superstrate thereby providing individual LC cells. The OPA electrical interconnects are routed in conductors on the common superstrate and passed to control circuits.

Although the OPA 58 is shown having a square shape other shapes may also be used. For example, as indicated by the dashed lines and reference numeral 58', the OPA may be provided having a round shape.

Figure 11:
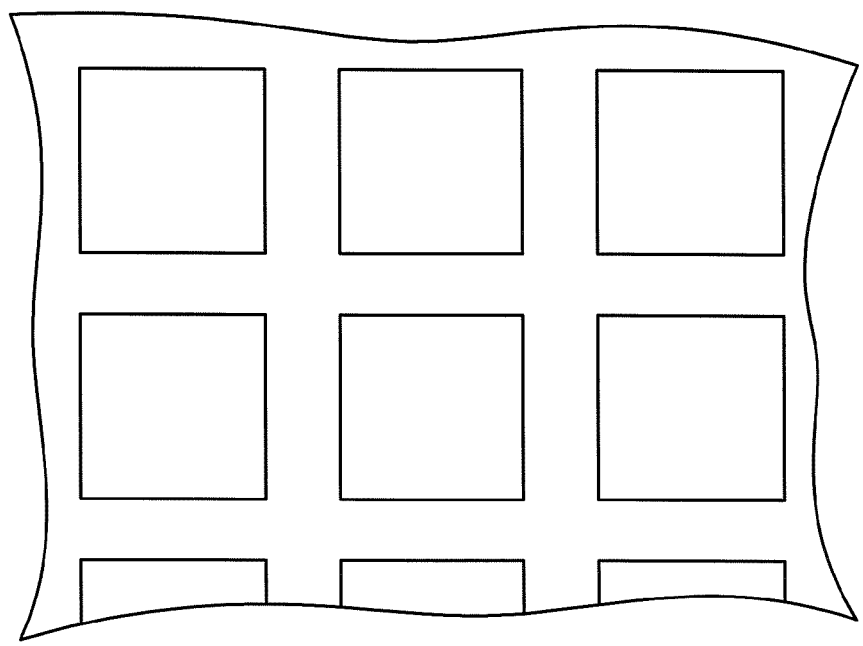
FIG. 11 is top view of a superstrate divided into a plurality of electrically isolated segments with a corresponding number of electrode containing substrates and control circuits disposed thereover.
Figure 11A:
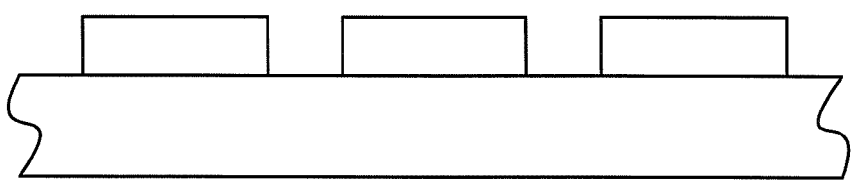
FIG. 11A is side view of a superstrate divided into a plurality of electrically isolated segments with a corresponding number of electrode containing substrates and control circuits disposed thereover.

Referring now to FIGS. 11 and 11A, a superstrate 70 may be divided into any number of electrically isolated segments with a corresponding number of electrode containing substrates and control circuits 72 disposed thereover. Thus, superstrate 70 may be provided having any shape, any number of electrically isolated regions and made to accommodate any number of substrates 72 as may be required or desired for any application. Also, it is not necessary to place a substrate 72 over every region formed in a superstrate. In some applications, it may be desirable to populate a superstrate with less than the maximum number of substrates.

SWAP reduction has, until this point, been focused on size and weight reduction of the individual optical sub-apertures. The assumption of maintaining this modular approach has never been challenged. Thus, one feature of the technique described herein is to transition away from the traditional modular approach to an integrated solution that uses common superstrates to improve alignment and thermal management of LC cells and population of multiple LC cells on a single common superstrate. A second solution that is described is the recognition that the common electrode side of an OPA can be fabricated using commercial methods at much larger sizes. Thus, populating multiple LC cells on a common superstrate to provide an OPA is described. Still another feature of the described system is the ability to provide interconnection circuits on the common superstrate for applications larger than 2×2 OPAs.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A transmissive beam steering aperture comprising:
a common superstrate provided from an optical material and having first and second opposing surfaces with at least one of the first and second surfaces having an electrode coating provided thereon to provide the at least one surface as a common electrode surface; and
a divider, provided on each common electrode surface, to provide each common electrode surfaces having a first plurality of electrically isolated common electrodes.

2. The aperture of claim 1 wherein said common superstrate has a thermally conductive channel provided in at least one of the first and second opposing surfaces of said common superstrate.

3. The aperture of claim 1 further comprising one or more electrode containing substrates, each of the one or more electrode containing substrates disposed over a respective one of the first plurality of electrically isolated common electrodes provided in said common superstrate to form one or more one liquid crystal (LC) cells.

4. The aperture of claim 3 wherein the one or more electrodes corresponds to a second plurality of electrode containing substrates, each of the second plurality of electrode containing substrates disposed over a respective one of the first plurality of electrically isolated common electrodes provided in said common superstrate to form at least one liquid crystal (LC) cell.

5. The aperture of claim 4 wherein the number of electrode containing substrates equals the number of electrically isolated common electrodes provided in said common superstrate.

6. The aperture of claim 5 further comprising control electronics coupled to at least one of the first plurality of LC cells.

7. The aperture of claim 6 wherein said common superstrate has a channel provided in at least one of the first and second opposing surfaces of said common superstrate.

8. The aperture of claim 7 wherein at least some of the control electronics are disposed in the channel.

9. The aperture of claim 8 wherein the channel is provided having thermally conductive material disposed therein.

10. The aperture of claim 9 further comprising a heat sink coupled to a portion of said superstrate and thermally coupled to the channel having the thermally conductive material disposed therein such that the heat sink is in thermal contact with at least some of said control electronics.

11. The aperture of claim 1 wherein each of the first and second opposing surfaces of said superstrate have an electrode coating provided thereon to provide each of the first and second opposing surfaces of said superstrate as a common electrode surfaces.

12. The aperture of claim 11 further comprising:
a first plurality of electrode containing substrates disposed over a corresponding one of the first plurality of electrically isolated common electrodes provided in the first surface of said common superstrate to form a first plurality of liquid crystal (LC) cells; and
a second plurality of electrode containing substrates disposed over a corresponding one of the second plurality of electrically isolated common electrodes provided in the second surface of said common superstrate to form a second plurality of liquid crystal (LC) cells.

13. The aperture of claim 12 wherein the first plurality of LC cells is not equal to the second plurality of LC cells.

14. The aperture of claim 12 wherein the first plurality of LC cells is equal to the second plurality of LC cells.

15. The aperture of claim 12 wherein said common superstrate has a thermally conductive channel provided in at least one of the first and second opposing surfaces of said common superstrate.

16. An optical phased array (OPA) aperture comprising:
a common superstrate having first and second opposing surfaces with a first one of the first and second surfaces corresponding to a common electrode surface having a plurality of electrically isolated common electrodes; and
a like plurality of electrode containing substrates, each of the first plurality of electrode containing substrates disposed over a corresponding one of the first plurality of electrically isolated common electrodes provided in said common superstrate to form a first plurality of liquid crystal (LC) cells such that each of the plurality of LC cells electrically interacts with only a corresponding one of said plurality of electrically isolated common electrodes on the common electrode surface of said common superstrate.

17. The OPA of claim 16 further comprising a plurality of control circuits, each of said plurality of control circuits coupled to a corresponding one of said plurality of LC cells.

18. The OPA aperture of claim 17 wherein said common superstrate has a channel provided in at least one of the first and second opposing surfaces of said common superstrate.

19. The OPA of claim 18 wherein at least some of said plurality of control circuits are disposed in the channel.

20. The OPA of claim 19 wherein the channel is provided having a thermally conductive material disposed therein.

21. The OPA of claim 20 further comprising a heat sink coupled to a portion of said superstrate and thermally coupled to the channel having the thermally conductive material disposed therein such that the heat sink is in thermal contact with at least some of said control circuits.

22. The OPA of claim 21 wherein each of the first and second opposing surfaces of said common superstrate correspond to common electrode surfaces having a plurality of electrically isolated common electrodes and said OPA further comprises a second plurality of LC cells disposed on the second surface of said common superstrate.

* * * * *